(12) United States Patent
Muhamad

(10) Patent No.: US 11,566,599 B2
(45) Date of Patent: Jan. 31, 2023

(54) ROTARY CONNECTION FOR A ROTOR BLADE OF A WIND TURBINE

(71) Applicant: Ibrahim Muhamad, Rostock (DE)

(72) Inventor: Ibrahim Muhamad, Rostock (DE)

( * ) Notice: Subject to any disclaimer, the term of this patent is extended or adjusted under 35 U.S.C. 154(b) by 296 days.

(21) Appl. No.: 16/951,822

(22) Filed: Nov. 18, 2020

(65) Prior Publication Data
US 2021/0071634 A1 Mar. 11, 2021

Related U.S. Application Data

(63) Continuation of application No. PCT/EP2019/054359, filed on Feb. 21, 2019.

(30) Foreign Application Priority Data

May 18, 2018 (DE) ...................... 10 2018 112 017.6

(51) Int. Cl.
*F03D 1/06* (2006.01)
*F03D 15/10* (2016.01)

(52) U.S. Cl.
CPC ........... *F03D 1/0658* (2013.01); *F03D 15/10* (2016.05); *F05B 2250/231* (2013.01);
(Continued)

(58) Field of Classification Search
CPC ........ F03D 1/0658; F03D 15/10; F03D 80/70; F05B 2250/231; F05B 2250/232;
(Continued)

(56) References Cited

U.S. PATENT DOCUMENTS

| 3,888,357 A | 6/1975 | Bauer et al. |
| 7,331,761 B2 | 2/2008 | Hansen et al. |

(Continued)

FOREIGN PATENT DOCUMENTS

| DE | 102012004329 A1 | 8/2013 |
| DE | 102013101233 A1 | 8/2013 |

(Continued)

OTHER PUBLICATIONS

International Search Report dated Jul. 9, 2019 in corresponding application PCT/EP2019/054359.
(Continued)

*Primary Examiner* — Ryan J. Walters
(74) *Attorney, Agent, or Firm* — Muncy, Geissler, Olds & Lowe, P.C.

(57) ABSTRACT

A rotary connection for a rotor blade of a wind turbine. The rotary connection is used, for example, for adjusting a rotor blade of a wind turbine. The rotary connection according contains an outer ring and an inner ring. The inner ring has a contact surface in the direction of the rotor blade and a screw fixing surface in the direction of the rotor hub. The contact surface and the screw fixing surface are arranged parallel to each other and provided with passage holes, which each have a central axis. Rolling elements are arranged in at least two running rows located under each other between the outer ring and the inner ring, wherein the rolling elements each have a rolling element diameter. According to the invention, at least the lower running row is arranged with its rolling element centre underneath the screw fixing surface.

9 Claims, 14 Drawing Sheets

(52) U.S. Cl.
CPC ... *F05B 2250/232* (2013.01); *F05B 2250/241* (2013.01); *F05B 2250/33* (2013.01); *F05B 2260/30* (2013.01); *F05B 2260/4031* (2013.01); *F05B 2260/79* (2013.01)

(58) Field of Classification Search
CPC ............ F05B 2250/241; F05B 2250/33; F05B 2260/30; F05B 2260/4031; F05B 2260/79; F05B 2240/50; F16C 33/586; F16C 2300/14; F16C 2360/31; F16C 19/08; Y02E 10/72
See application file for complete search history.

(56) References Cited

U.S. PATENT DOCUMENTS

| | | | | |
|---|---|---|---|---|
| 7,927,019 | B2* | 4/2011 | Yoshida | F16C 19/505 384/512 |
| 8,322,928 | B2* | 12/2012 | Larsen | F16C 33/60 384/129 |
| 8,915,715 | B2 | 12/2014 | Schröppel | |
| 9,239,040 | B2 | 1/2016 | Leonard | |
| 9,273,732 | B2* | 3/2016 | Ebbesen | F16C 35/06 |
| 9,328,716 | B2 | 5/2016 | Alti Barbon et al. | |
| 9,567,973 | B2* | 2/2017 | Pasquet | F03D 80/70 |
| 10,794,422 | B1* | 10/2020 | Galehouse | F03D 80/70 |
| 2009/0016665 | A1* | 1/2009 | Yoshida | F03D 80/70 384/613 |
| 2014/0003946 | A1 | 1/2014 | Moore et al. | |

FOREIGN PATENT DOCUMENTS

| | | |
|---|---|---|
| DE | 102013216841 A1 | 2/2015 |
| EP | 1887237 A1 | 2/2008 |
| EP | 2679805 A1 | 1/2014 |
| EP | 2304232 B1 | 4/2015 |
| EP | 2816225 B1 | 11/2016 |

OTHER PUBLICATIONS

"Slewing Ring/Turntable Bearings Catalog 390", Jan. 1, 2008, pp. 1-9, Kaydon Corporation.

* cited by examiner

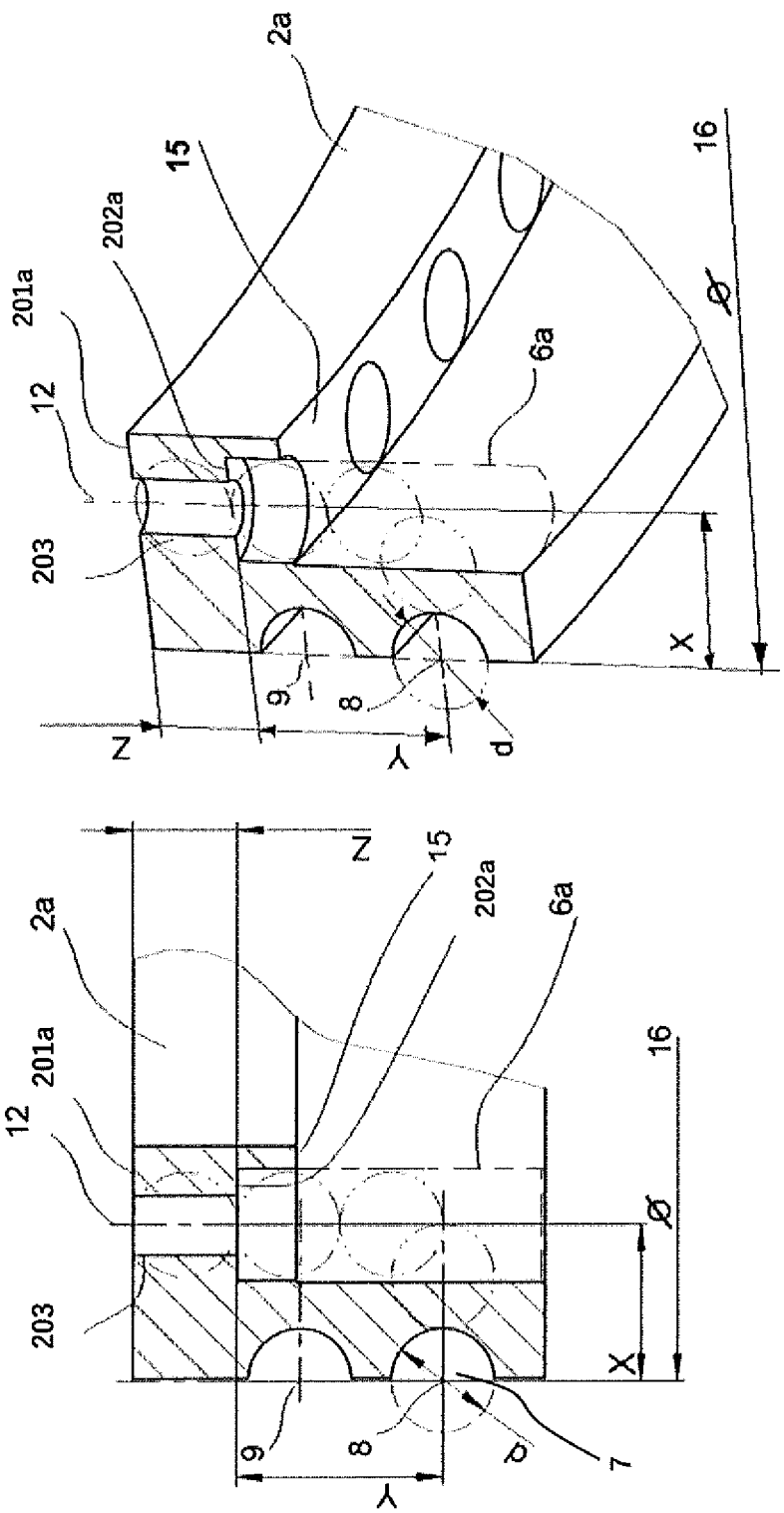

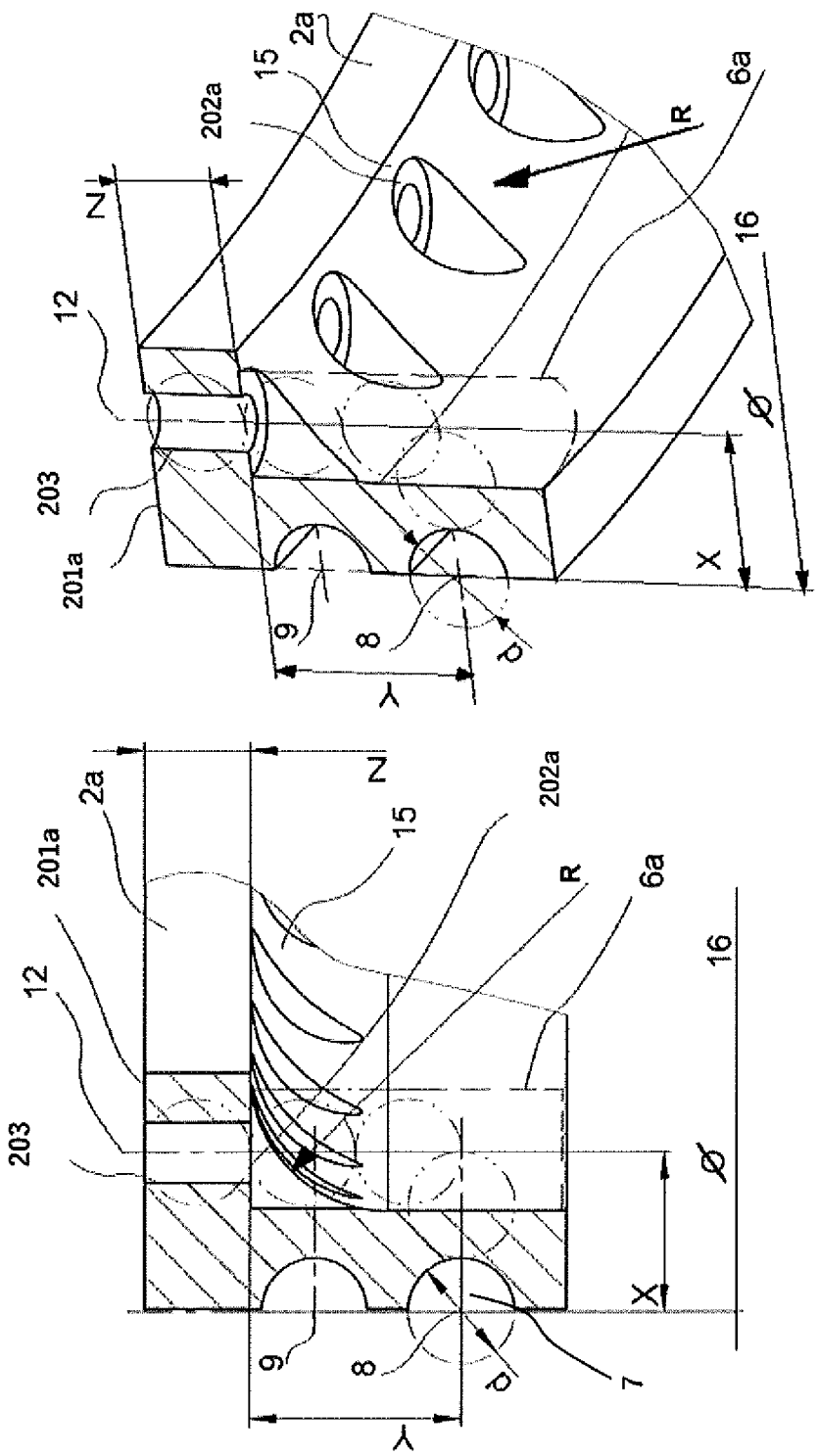

ROTARY CONNECTION FOR A ROTOR BLADE OF A WIND TURBINE

This nonprovisional application is a continuation of International Application No. PCT/EP2019/054359, which was filed on Feb. 21, 2019, and which claims priority to German Patent Application No. 10 2018 112 017.6, which was filed in Germany on May 18, 2018, and which are both herein incorporated by reference.

BACKGROUND OF THE INVENTION

Field of the Invention

The present invention relates to a slewing ring for a rotor blade of a wind power plant; in particular, the invention relates to the inner ring of a slewing ring of this type. The slewing ring is used, for example, for the adjustment of a rotor blade of a wind power plant.

Description of the Background Art

The slewing ring as a rule has an outer ring, an inner ring and rolling bodies. The inner and outer ring can be of single-piece configuration or else can be configured in a multiple-piece form. The rolling bodies can be configured as a ball, frustoconical or cylindrical shape. Furthermore, depending on the use case of the slewing rings, the two rings are sealed with respect to one another by means of seals. Depending on the type, embodiment and requirement, the rolling bodies are held at a defined spacing by means of a cage.

Slewing rings are used where components, mounted on an axial arrangement in each case on the inner and outer ring, are to carry out a relative movement in the form of pivoting or rotating. This is the case, for example, in the case of the boom of a revolving tower crane, the upper structure of an excavator, the nacelle of a wind power plant, and the rotor blade of a wind power plant.

The inner and outer ring are as a rule configured from rolled, forged or cast steel rings, in order to withstand the high loads of the respective use case. The inner and outer ring are usually provided with raceways, on which rolling bodies roll so as to rotate about their own axis. Said rolling bodies can be held in position in a positively locking or else non-positive manner within the slewing ring, in position on the respective raceways.

On account of the production methods of the inner and outer ring, such as ring forging, ring rolling or steel casting, they can have an individual contour and, depending on the use case, are subjected to primary forming and are subsequently machined. For example, the inner ring for the adjustment of a rotor blade of a wind power plant, which inner ring is part of a slewing ring with an anti-friction bearing, is the subject matter of the described invention.

Since the mounting of the rotor blade is as a rule screwed axially to one of the bearing rings of the slewing ring, the type, position and configuration of the mounting surfaces and bores are an important point of the design of the bearing rings which are produced individually for the use and installation case. A further important aspect for the design of the respective ring is the respective necessary space requirement which the screw connection takes up on the inner and outer ring, and can therefore influence the surrounding construction unfavorably.

Slewing rings are often incorporated directly into the drive equipment. Here, the inner or outer ring plays an active role depending on the embodiment. Depending on the type and application, the inner or outer ring is provided with a toothing system which can be pivoted or rotated by means of a fixed drive. In addition to the variant of a toothing system, the inner or outer ring can also have a connector geometry to a linear adjusting drive.

EP 2 304 232 B1, which corresponds to U.S. Pat. No. 8,915,715, discloses a slewing ring in the form of a ball bearing mounted slewing ring with two running rows without the function of an integrated drive device. In contrast, U.S. Pat. No. 7,331,761 B2 discloses a slewing ring with two raceways and an integrated toothing system on the inner ring for the adjustment of a rotor blade of a wind power plant.

FIG. 1 shows, for example, the use of a slewing ring with a toothed inner ring, screwed to a rotor blade and a rotor hub in accordance with the prior art.

Furthermore, DE 10 2013 101 233 A1, which corresponds to U.S. Pat. No. 9,239,040, discloses an additional element, in the form of a rotor blade extension (also called extender, however) which is intended to enable the adaptation of various rotor blade diameters to the rotor hub.

SUMMARY OF THE INVENTION

It is therefore an object of the present invention to provide ideal space conditions for the axial screw connection of the rotor blade to the inner ring, to provide a greater variance of the hole circle diameter of the screw connection of the rotor blade with respect to the rolling circle of the running rows of the slewing ring, to achieve an ideal stiffness distribution by way of a higher cylindrical length of the inner ring, to lengthen the rotor blade and therefore to increase the output of the wind power plant.

The slewing ring according to the invention for a rotor blade of a wind power plant comprises an outer ring and an inner ring. The inner ring has a supporting surface in the direction of the rotor blade and a screwing surface in the direction of the rotor hub. The supporting surface and the screwing surface are arranged parallel to one another, and are provided with through bores which in each case have a center axis. Rolling bodies are arranged between the outer ring and the inner ring in at least two running rows I/II which lie below one another, the rolling bodies having a rolling body diameter d. According to the invention, at least the lower running row I is arranged with its rolling body center below the screwing surface.

The rolling body center of the lower running row I can be at a spacing X in the radial direction of greater than or equal to 1.5 times the rolling body diameter d, measured from the rolling body center to the center axis of the through bores, and is at a spacing Y in the axial direction of greater than or equal to 2 times the rolling body diameter d, measured from the rolling body center to the screwing surface, and has a parallel offset Z of greater than or equal to 0.7 times the rolling body diameter d, measured between the supporting surface and the screwing surface.

An installation space can be arranged below the inner ring in a manner which is adjacent with respect to the screwing surface, which installation space is defined from the spacing X in the radial direction and the spacing Y in the axial direction, and is of cylindrical or circularly annular configuration.

The screwing surface can have a surface portion which is parallel to the supporting surface, the parallel surface portion running in a rotationally symmetrical manner over the entire inner ring. As an alternative, a circumferential residual surface surrounds individual screwing surfaces.

The screwing surface can be recessed in the inner ring and lies offset in parallel with respect to the remaining residual surface. The offset can be formed to be up to four times the rolling body diameter d.

The residual surface can be formed in a plane angle W° of from 0° to 75° with respect to the screwing surfaces.

The residual surface can be formed in a concavely rounded manner, with a defined radius.

The rolling bodies between the outer ring and the inner ring can be of spherical, frustoconical or cylindrical configuration.

The inner ring can be connected to a linear actuating drive. The actuating drive can be an actuating drive which is driven by way of a gearwheel.

It is an advantage of the invention that the force-transmitting connection and the torques which come from the rotor blade are conducted on a direct path through the running rows of the slewing ring, via the outer ring into the loadbearing structure of the rotor hub. Furthermore, an additional element, in the form of a rotor blade extension or else what is known as an extender as disclosed in DE 10 2013 1012 33 A1, which corresponds to U.S. Pat. No. 9,239,040, which is incorporated herein by reference, is circumvented or can be combined with the invention. An additional screwing plane and the connector thereof are likewise no longer required. In addition to the abovementioned advantages, the invention likewise affords the possibility of a simplified and/or improved casting geometry of the rotor hub, since the required screw and screwing region has to be at a distance from the cast body in the case of maintenance and assembly on account of pivoting and rotating movements.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 6a and 6b show an illustration of a residual surface which is offset in parallel, in different perspectives, FIGS. 7a and 7b show an illustration of one embodiment with a concavely rounded residual surface in different perspectives.

DETAILED DESCRIPTION

Figure 1:
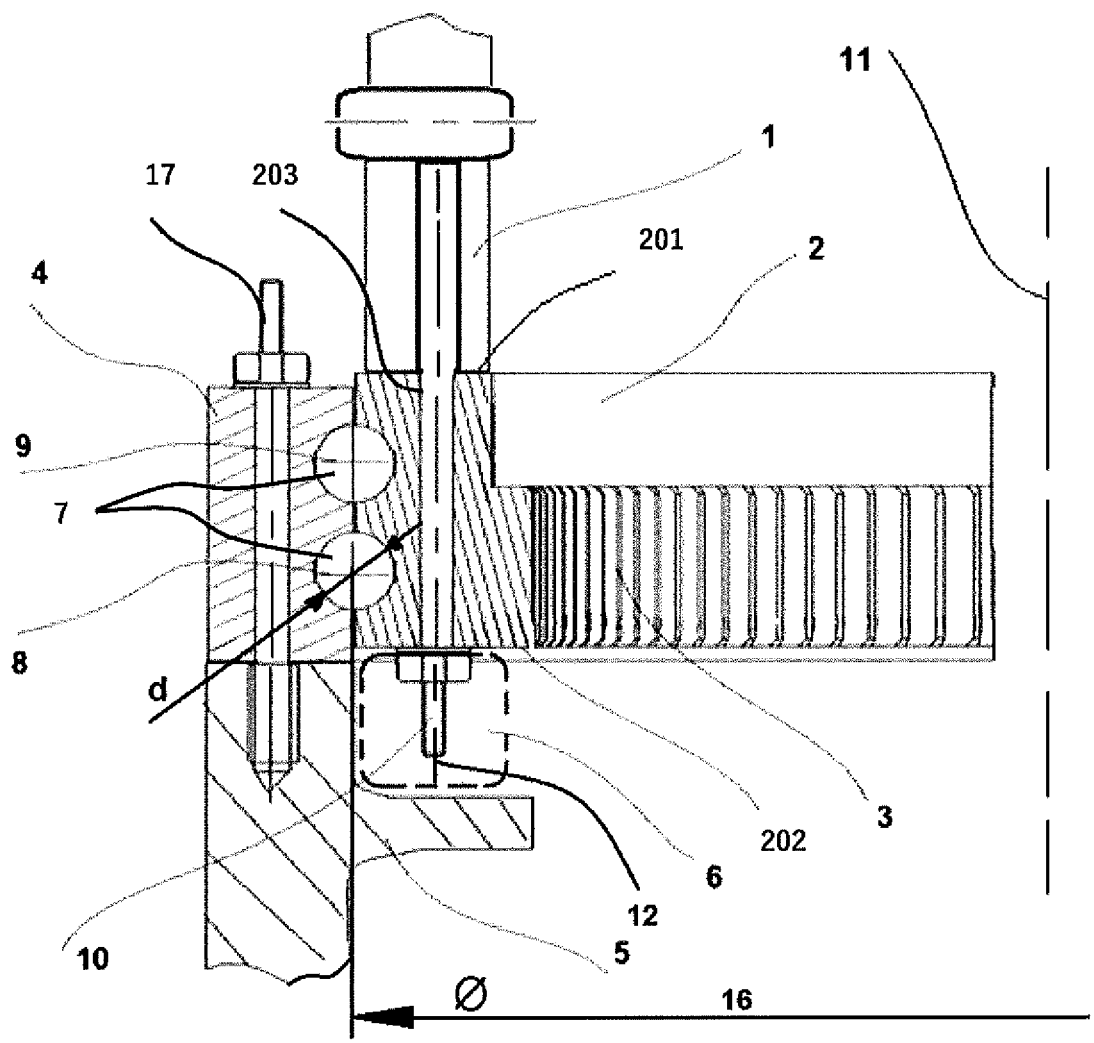
FIG. 1 shows the prior art.

FIG. 1 shows, for example, the use of a slewing ring with an inner ring 2 with a toothing system 3, screwed to a rotor blade 1 and a rotor hub 5 in accordance with the prior art. The screw connection 10 of the rotor blade 1 takes place by way of axial through bores 203 through the inner ring 2 which have a center axis 12. The screw connection 17 connects the outer ring 4 of the slewing ring to the rotor hub 5. The rotor blade 1 lies on the supporting surface 201 of the inner ring 2, which supporting surface 201 is arranged parallel to the screwing surface 202. The screw connection 10 takes up the installation space 6 below the inner ring 2, and lies on the rotor hub-side screwing surface 202 on the inner ring 2. The cast geometry of the rotor hub 5 is influenced unfavorably by way of the necessary installation space 6 for the screw connection 10, and is greatly impaired in terms of the possibility of the ideal absorption of force which flows in through the outer ring 4 for the running row I 8 and running row II 9. The system comprising the rotor blade 1, the inner ring 2 and the screw connection 10 rotates about the rotor blade axis 11. The spacing between the rotor blade axis 11 and the center of the rolling bodies 7 of the running row I 8 and the running row II 9 is defined as raceway diameter 16.

Figure 2:
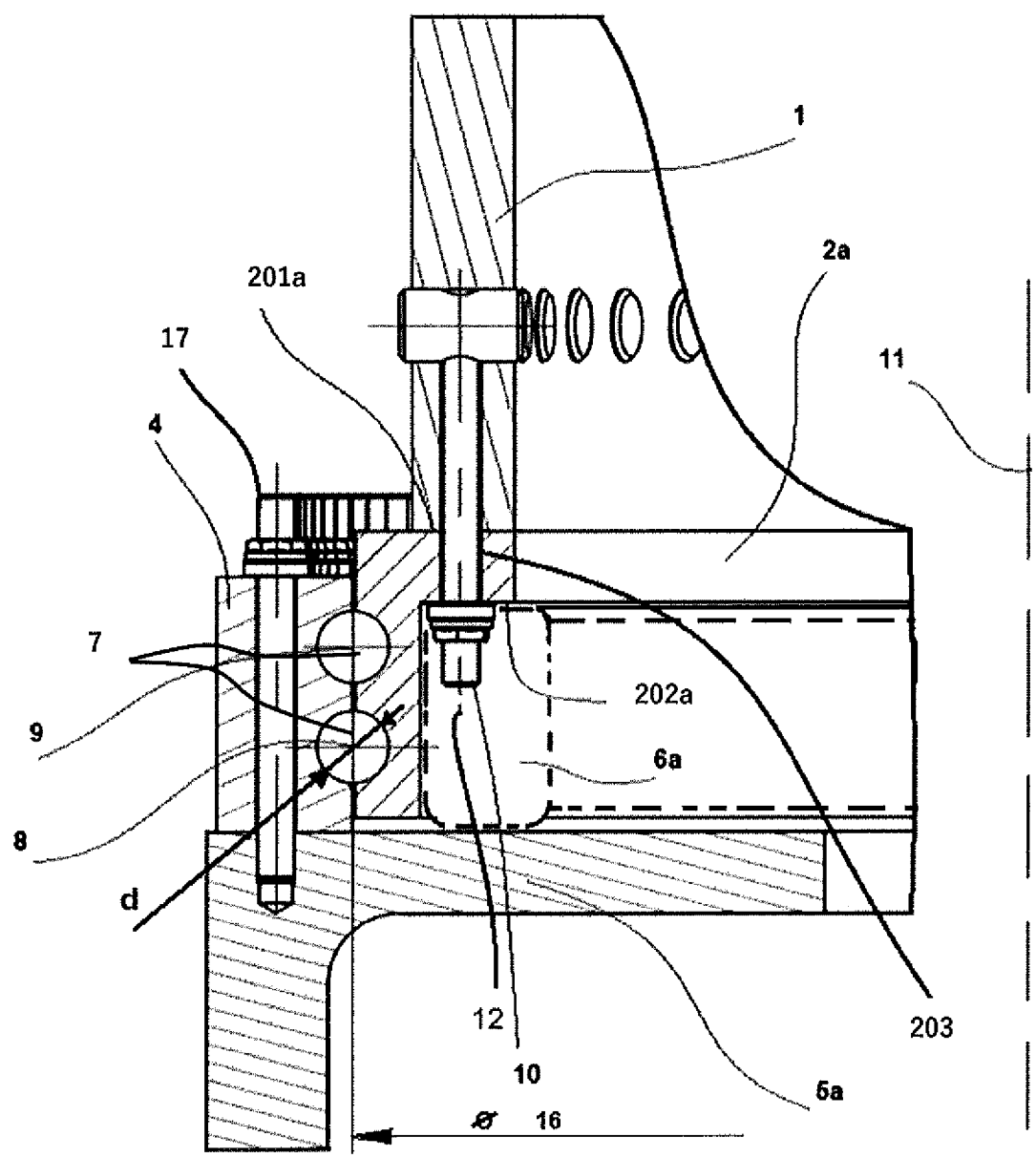
FIG. 2 shows an illustration of the invention in use (inner ring without toothing system)
Figure 14:
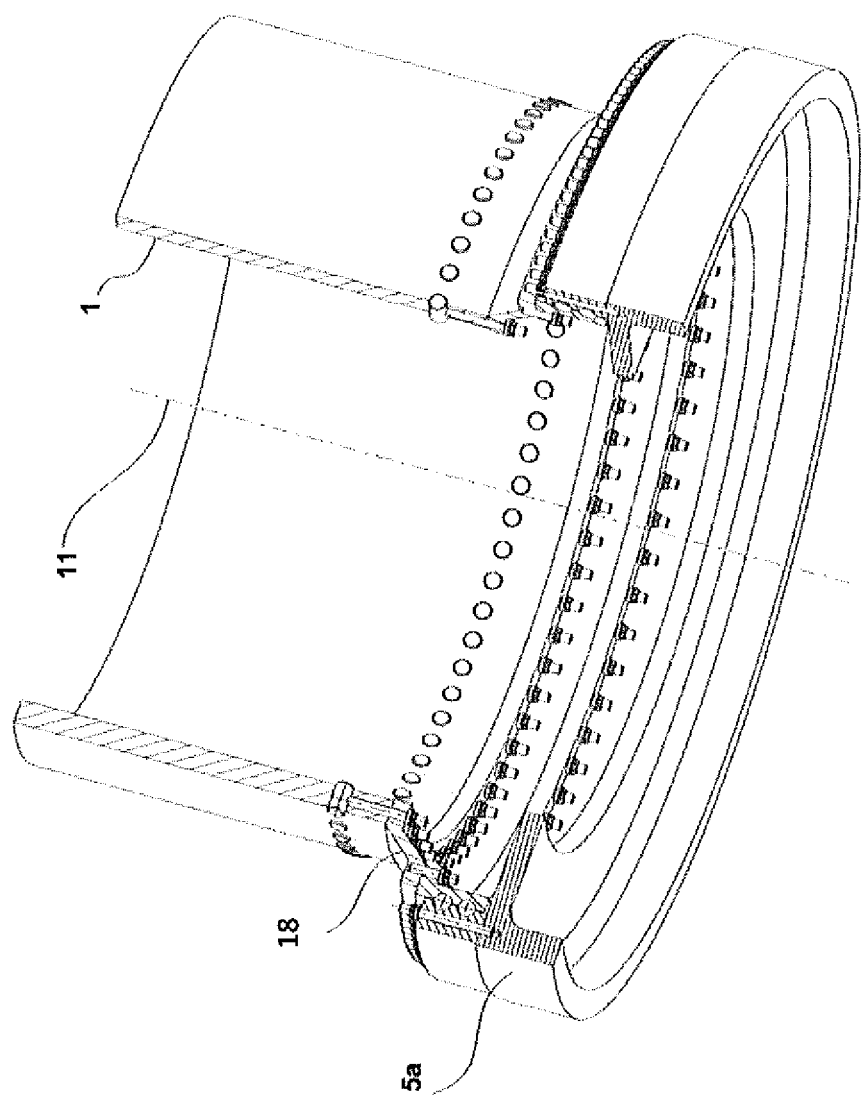
FIG. 14 shows an illustration of an area of use of the invention in combination with an extender.

FIG. 2 shows the invention in the installed state without integrated drive equipment. In an analogous manner with respect to the prior art, the rotor blade 1 is fastened by way of axial through bores 203 through the inner ring 2a, and lies on the supporting surface 201a (also called a blade or extender supporting surface). As an alternative, what is known as an extender can also be connected to the inner ring 2a. All the further descriptions relate to the embodiment with a rotor blade 1, but can also be applied to the variants with extenders. FIG. 14 is intended to illustrate an application of this type.

FIG. 2 shows, furthermore, that the running rows I 8 and II 9 with spherical rolling bodies 7 are arranged between the inner ring 2a and the outer ring 4. As described in further exemplary embodiments, the rolling bodies 7 can also be, for example, of spherical, frustoconical or cylindrical configuration.

It is shown in FIG. 2, furthermore, that the screw connection 10 takes up the installation space 6a below the inner ring 2a, and lies on the rotor hub-side screwing surface 202a on the inner ring 2a. The novel geometry of the inner ring 2a makes an offset screwing surface 202a possible, and defines a novel installation space 6a above the optimized cast geometry of the rotor hub 5a. In every case, the running row I 8 is always situated with its rolling body center below the screwing surface 202a. In all the embodiments, the supporting surface 201a and the screwing surface 202a are arranged in parallel. The screwing surface 202a has the parallel surface portion which is required at least with respect to the supporting surface 201a, and which the screw connection 10 requires for secure screwing, for assembly and for maintenance work. The parallel surface portion can also extend, however, in a rotationally symmetrical manner (as shown in FIG. 2) over the entire parallel surface. The region which is not required further for secure screwing and for the maintenance is called a residual surface 15 (FIG. 3) in the further course of this description. Depending on the geometry, the inner ring 2a can be produced by way of ring forging, ring rolling or steel casting.

FIG. 2 shows, furthermore, that the installation space 6a defines a circularly annular volume in a manner which runs around below the screwing surface 22a as far as the cast contour of the rotor hub 5a.

Figure 3:
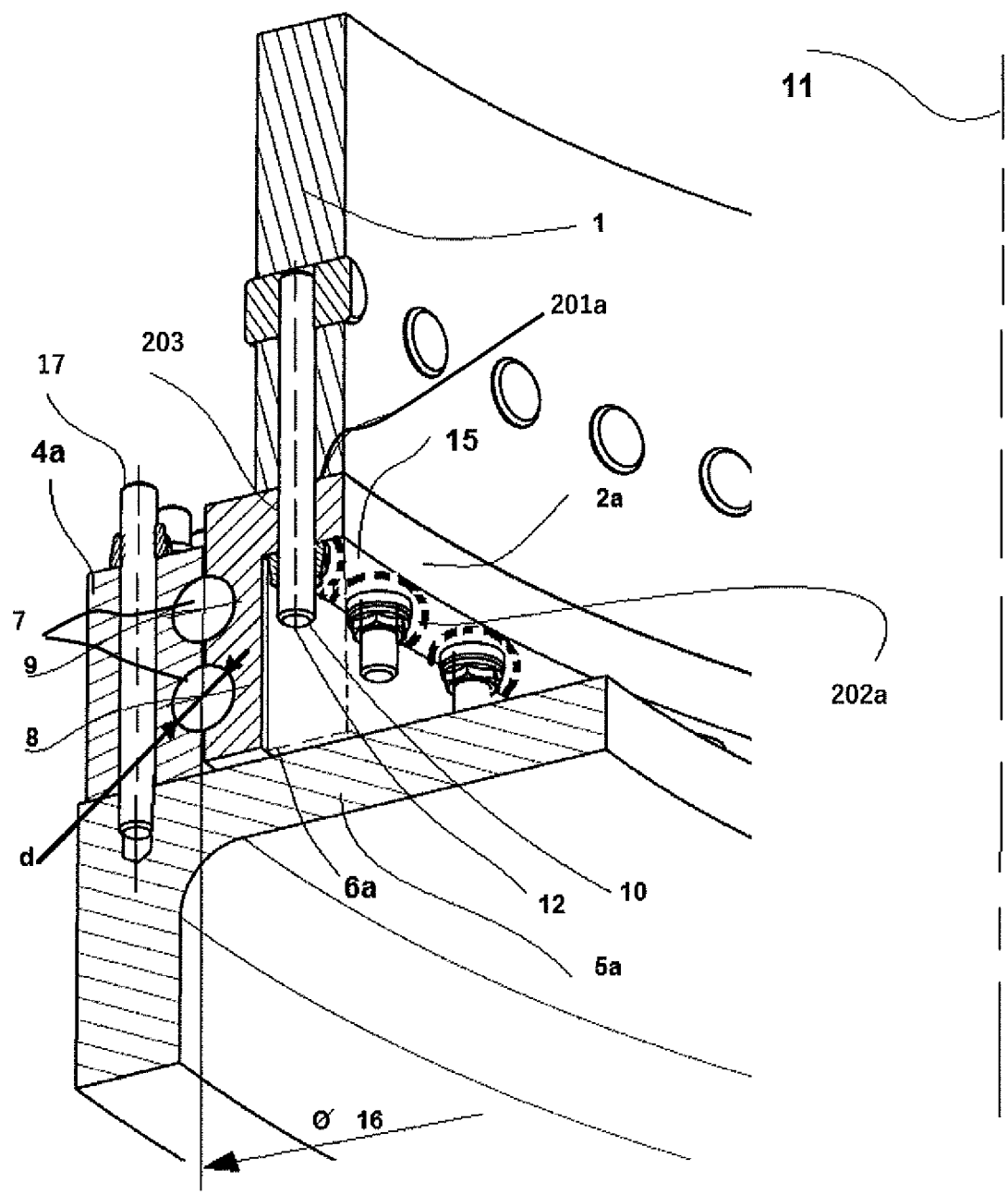
FIG. 3 shows an isometric illustration of the invention in use.

FIG. 3 shows an isometric illustration of the invention in use, in the case of which isometric illustration an inner ring 2a without a toothing system and a residual surface 15, and a screwing surface 202a can be seen which are identical in this exemplary embodiment.

The invention is not necessarily linked to a slewing ring with spherical rolling bodies 7. The invention likewise also includes rolling bodies 7 in an embodiment with a cylindrical roller geometry or a frustoconical geometry. The system comprising the rotor blade 1, the inner ring 2a and the screw connection 10 rotates about the rotor blade axis 11 in an analogous manner with respect to the prior art.

Figure 4B:
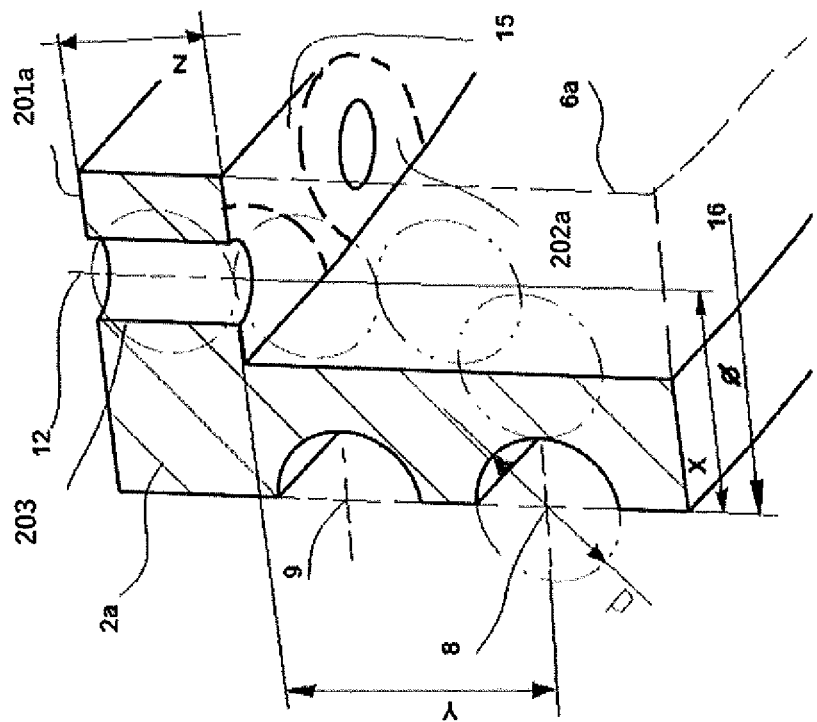
FIGS. 4a and 4b show an illustration of a geometric definition of the inner ring in different perspectives.
Figure 4A:
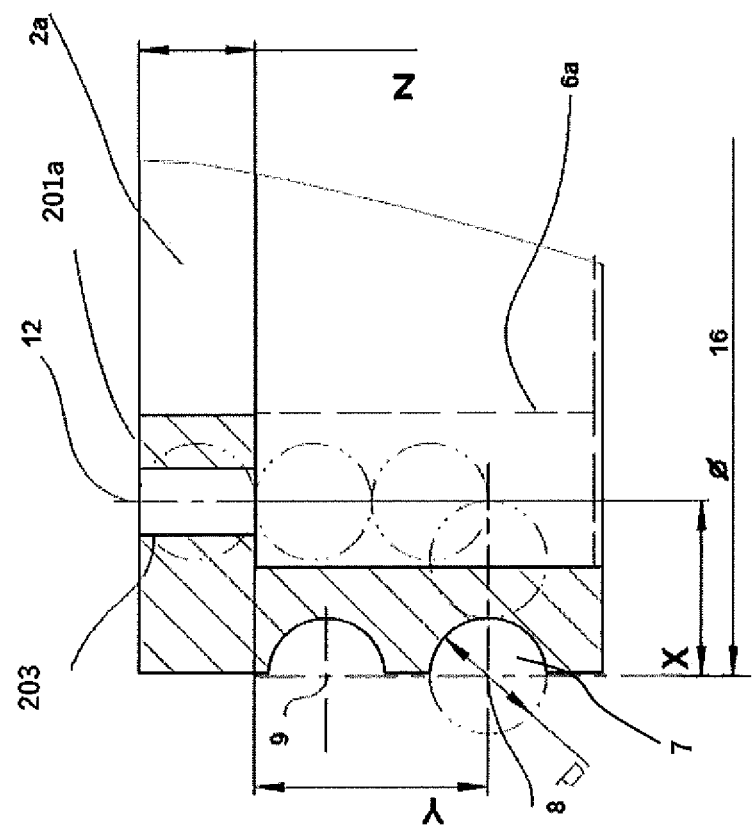

The inner ring 2a of the slewing ring is defined in FIGS. 4a/4b and 5a/5b, the shape of the inner ring 2a being defined by way of four geometric relationships.

Figure 5A:
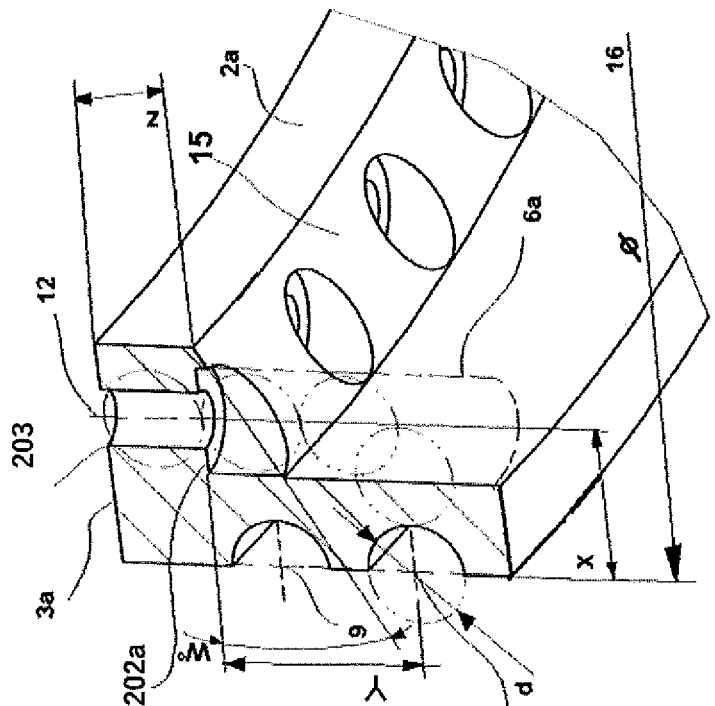
FIGS. 5a and 5b show an inner ring illustration at a plane angle W=30° in different perspectives.

FIGS. 4a/4b show an illustration of a geometrical definition of the inner ring 2a in different perspectives. The residual surface 15 has a planar angle W=0° with respect to the screwing surface 202a. FIGS. 5a/5b likewise show an illustration of the inner ring 2a in different perspectives, the residual surface 15 being arranged in this exemplary embodiment with a planar angle W of greater than from 0° to 75° with respect to the screwing surface 202a.

Firstly, the radial spacing X between the center of the rolling body 7 of the running row I 8 and the through bore 203 which serves for mounting the rotor blade 1 is set in a relationship with the rolling body diameter d of the running row I 8. The described spacing X is at least one and a half times (and more) the rolling body diameter d.

The second geometric relationship is defined by way of the position of the screwing surface 202a in relation to the center of the rolling body 7 of the running row I 8. Here, the spacing Y between the rolling body center of the running row I 8 and the screwing surface 202a of the inner ring 2a in the direction of the rotor blade axis 11 is fixed to at least two times the rolling body diameter d of the running row I 8 (and more).

The axial material thickness Z between the supporting surface 201a and the screwing surface 202a is defined by way of the third geometric relationship. Here, a minimum material thickness Z of 0.7 times the rolling body diameter d (and more) is described.

The installation space 6a below the inner ring 2a is defined from the spacing X in the radial direction and the spacing Y in the axial direction, and is of cylindrical or circularly annular configuration. The length of the installation space 6a for assembly and maintenance work in the axial direction can reach as far as the contour of the rotor hub 5a.

FIGS. 4a/4b describe the embodiment of an inner ring 2a with spherical rolling bodies 7.

FIGS. 5a/5b show the fourth geometric relationship. Here, the residual surface 15 which does not serve for the screw connection 10 is arranged at a plane angle W of from 0° to 75° with respect to the screwing surface 202a. A residual surface 15 which is shaped favorably depending on the requirement makes an ideal introduction of force and torque for the rolling bodies 7 into the outer ring 4 possible.

In a further exemplary embodiment, FIGS. 6a/6b show a screwing surface 202a which is recessed in the inner ring 2a in different perspectives, the screwing surface 202a lying offset in parallel with respect to a remaining residual surface 15. This can have an offset of up to four times the rolling body diameter d.

FIGS. 7a/7b show an embodiment with a residual surface 15 which is rounded concavely with a defined radius, in different perspectives. As a result, the concave residual surface 15 contributes additionally to the stabilization of the inner ring 2a.

Figure 8:
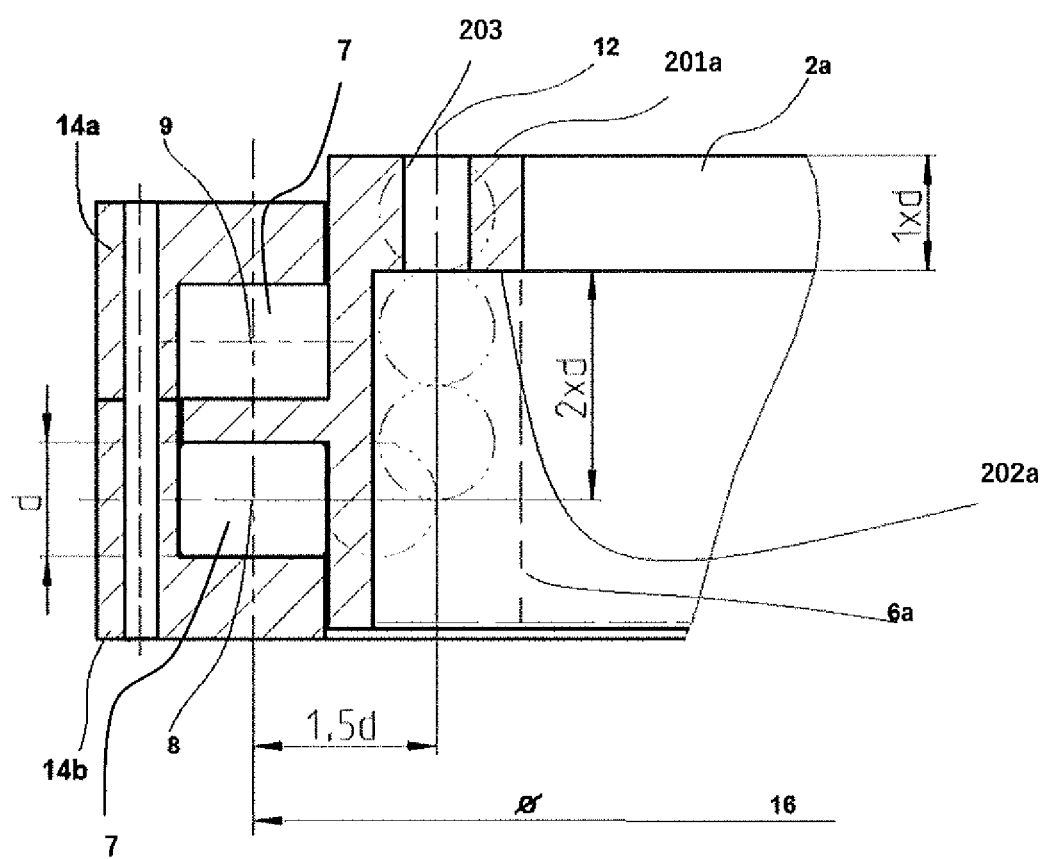
FIG. 8 shows an illustration of one embodiment with cylindrical rollers.

FIG. 8 shows a slewing ring with cylindrical rollers as rolling bodies 7. In the case of said embodiment, the arrangement of the cylindrical rollers is perpendicular with respect to the rotational axis of the rotor blade 1. A split outer ring 14a/14b acts in combination with the inner ring 2a, the interaction between the inner ring 2a and the split outer ring 14a/14b taking place in a manner which corresponds to the above-described geometric relationships.

Further, frustoconical rolling bodies 7 can be used. The geometric definitions of the inner ring 2a then take place with the aid of the smallest rolling body diameter.

Figure 5B:
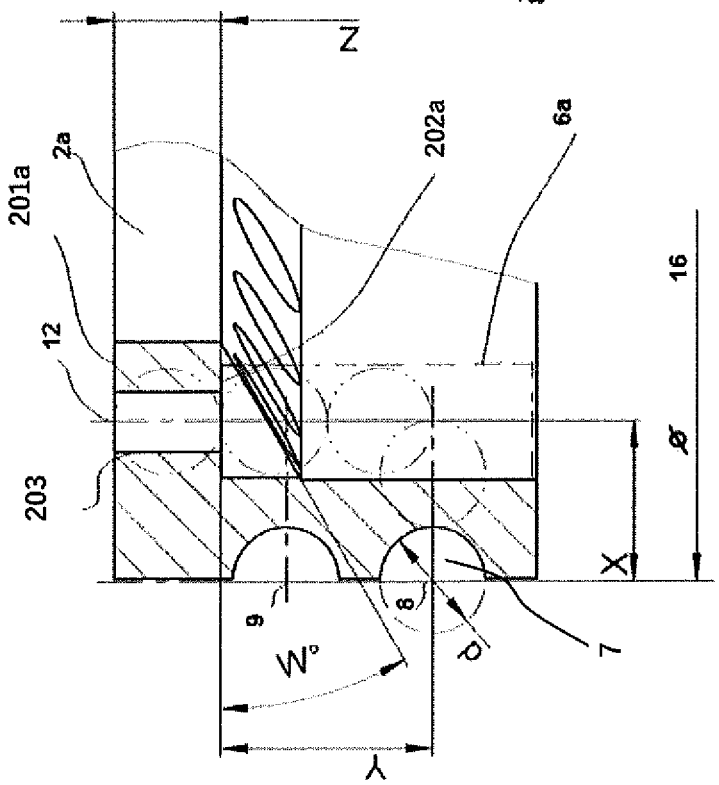
Figure 9B:
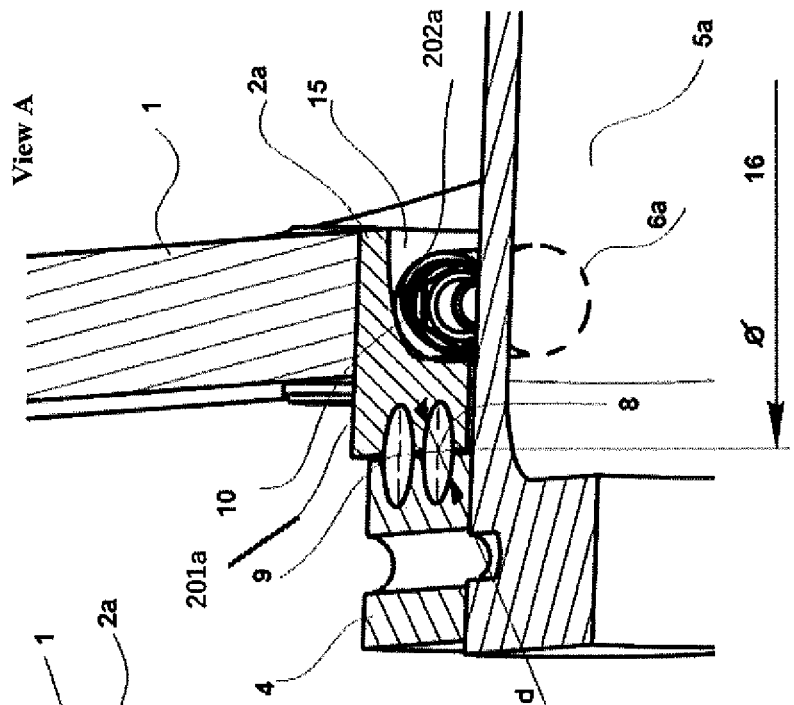
FIGS. 9a and 9b show an illustration of a minimum clearance in one embodiment with an individual volume according to FIG. 2.
Figure 9A:
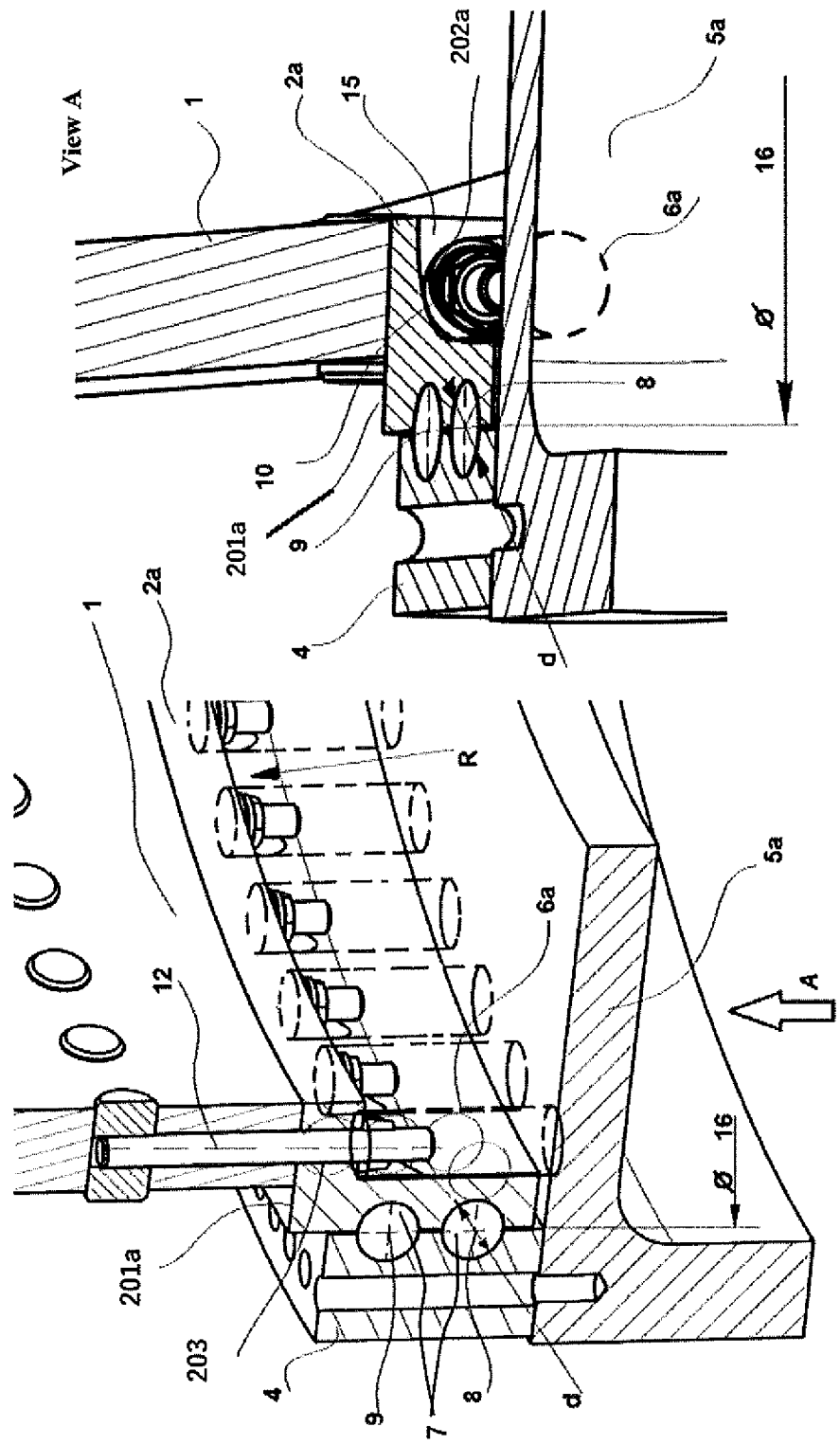

FIGS. 9a/9b show an illustration of a minimum installation space 6a which is necessary for the screw connection 10 and the assembly and for the maintenance, in one embodiment with a circularly annular individual volume according to FIG. 2. The minimum volume of the installation space 6a as a circumferential circular ring results directly from the screwing surface 202a (FIGS. 2, 3, 4 and 8), and extends over a maximum length as far as the adjoining cast contour of the rotor hub 5a. As an alternative, in the case of individual and separate screwing surfaces 202a, a large number of cylindrical individual volumes result in a manner which corresponds to the number of connectors 10 (FIGS. 5, 6 and 7).

Figure 10:
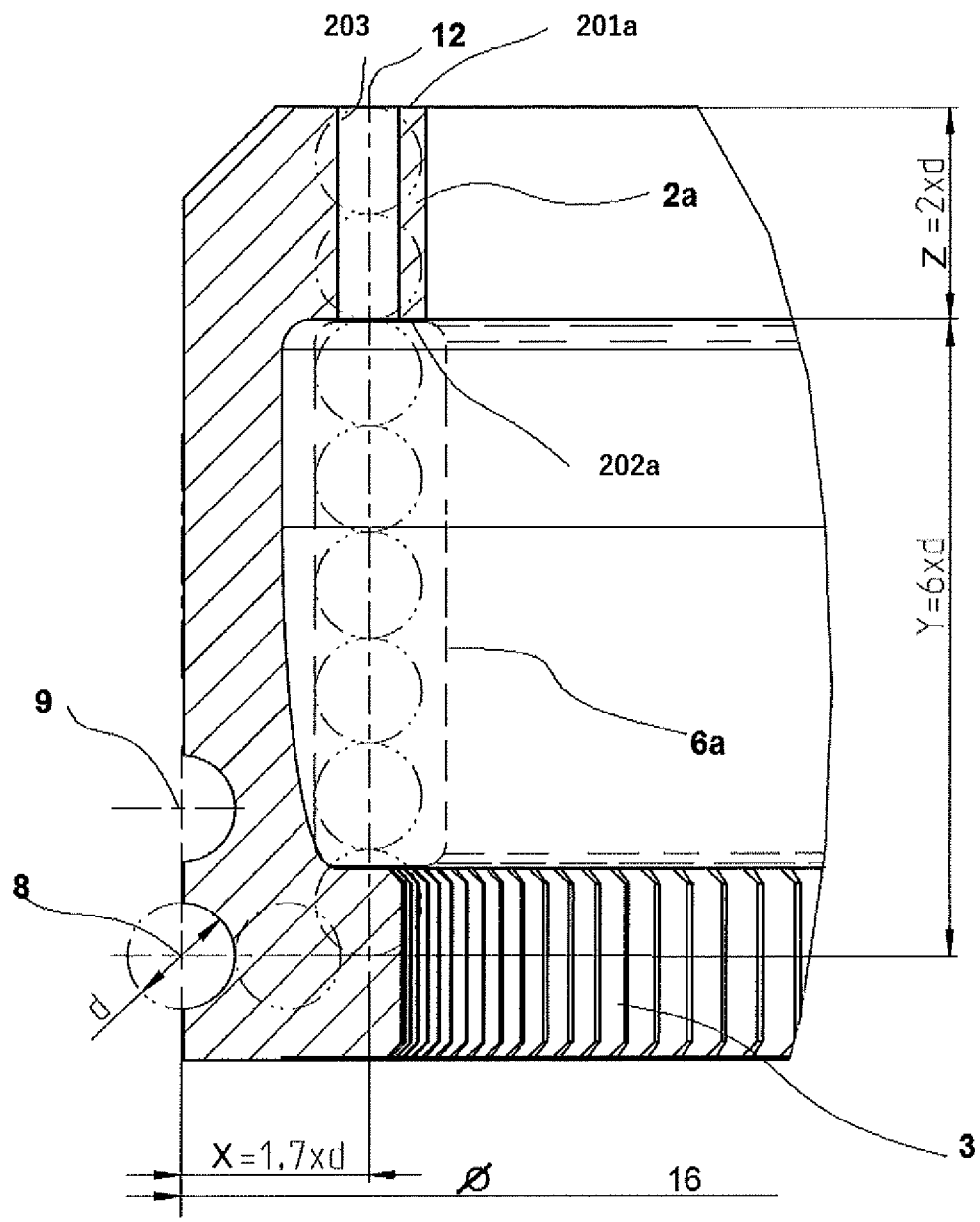
FIG. 10 shows an exemplary embodiment with a toothing system.
Figure 11:
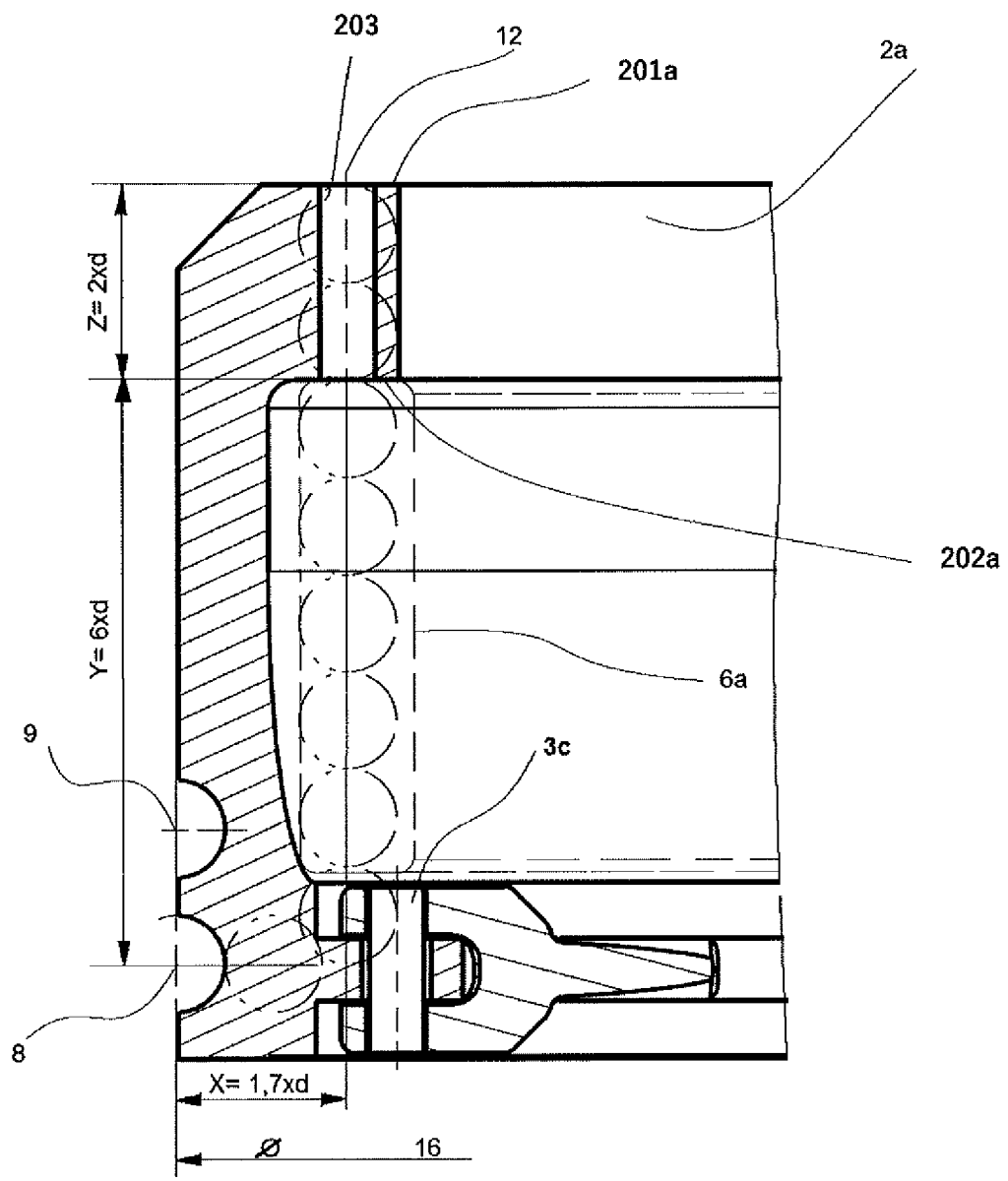
FIG. 11 shows an exemplary embodiment with a linear adjusting drive.

FIG. 10 shows one exemplary embodiment with a toothing system 3 of integrated drive equipment, and FIG. 11 shows one exemplary embodiment with a linear actuating drive 3c. For this purpose, exemplary refinements of the inner rings 2a are shown in FIGS. 10 and 11. In the case of said embodiment, the installation space 6a is delimited in the axial direction by way of the integrated drive equipment or the actuating drive 3c.

Figure 12A:
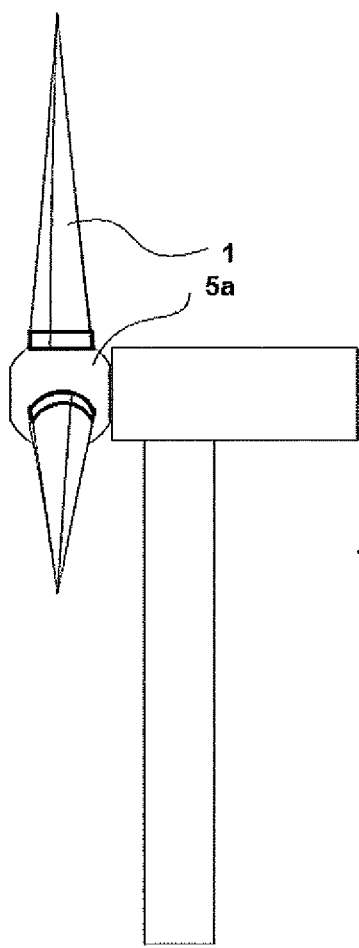
FIGS. 12a and 12b show an illustration of a wind power plant in different perspectives.
Figure 12B:
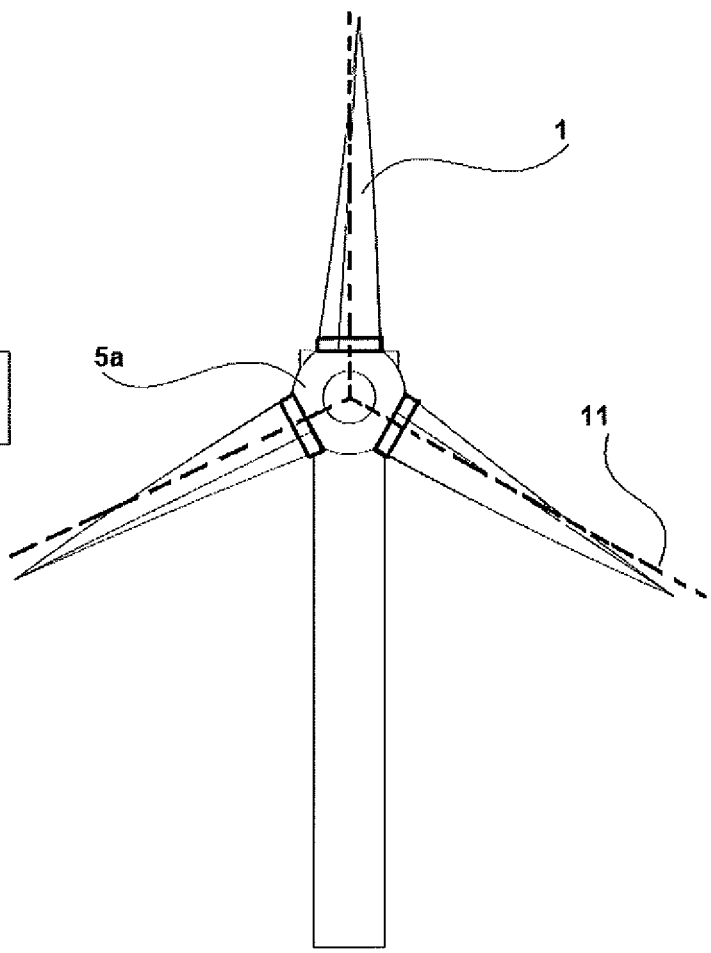

FIGS. 12a/12b show a wind power plant in different perspectives. The wind power plant has a tower, on which a nacelle is arranged rotatably. The nacelle is provided with a rotor which has a rotor hub 5a. The rotor blades 1 are mounted rotatably on the rotor hub 5a. The solution according to the invention is arranged between the rotor hub 5a and the rotor blade 1. If an extender is arranged between the rotor blade 1 and the rotor hub 5a, in order for it to be possible for the size of the rotor blade 1 to be adapted to the size of the rotor hub 5a, the solution according to the invention is arranged between the rotor hub 5a and the extender 18 (FIG. 14).

Figure 13:
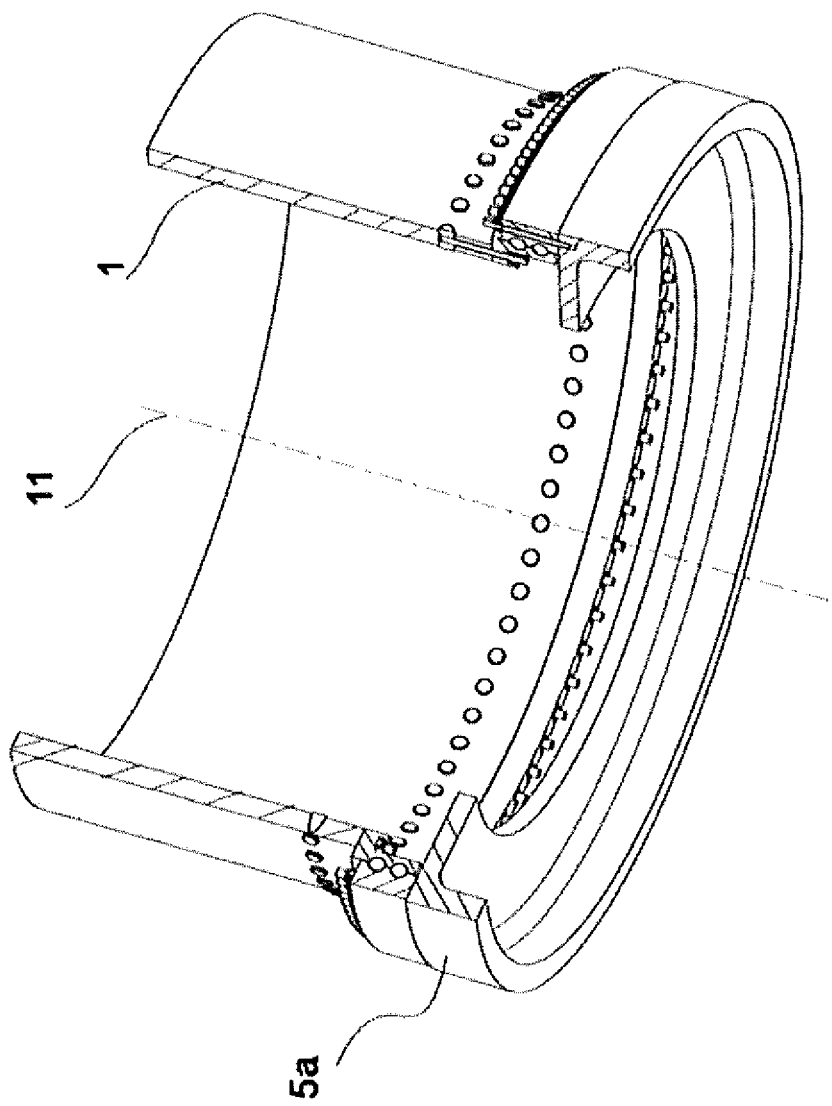
FIG. 13 shows an illustration of an area of use of the invention.

FIG. 13 shows an application of the solution according to the invention. A detail of a rotor blade 1 which is connected to the inner ring 2a can be seen. Furthermore, the outer ring 4 and the rolling bodies 7 can be seen. The rotor blade axis 11 runs centrally with respect to the inner ring 2a and with respect to the outer ring 4.

FIG. 14 shows an illustration of an area of use of the invention in combination with an extender 18 which is shown, for example, in different embodiments in EP 2 816 225 B1 (which corresponds to U.S. Pat. No. 9,328,716), DE 10 2013 101 233 A1 (which corresponds to US 2013/0216394) and EP 2 679 805 A1 (which corresponds to US 2014/0003946), which are all incorporated herein by reference.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A slewing ring for a rotor blade of a wind power plant, the slewing ring comprising:
   an outer ring;
   an inner ring having a supporting surface in a direction of the rotor blade and a screwing surface in a direction of a rotor hub, the supporting surface and the screwing surface being arranged parallel to one another, and being provided with through bores that have a center axis; and
   rolling bodies arranged between the outer ring and the inner ring in at least two running rows I/II that lie below one another, the rolling bodies having a rolling body diameter,
   wherein at least a lower running row is arranged with its rolling body center below the screwing surface at a spacing Y in the axial direction of greater than or equal to 2 times the rolling body diameter measured from the rolling body center to the screwing surface; wherein the rolling body center of the lower running row is at a spacing X in a radial direction of greater than or equal to 1.5 times the rolling body diameter measured from the rolling body center to the center axis of the through bores and has a parallel offset greater than or equal to 0.7 times the rolling body diameter measured between the supporting surface and the screwing surface.

2. The slewing ring as claimed in claim 1, wherein an installation space is arranged below the inner ring in a manner which is adjacent with respect to the screwing surface, which installation space is defined from the spacing X in the radial direction and the spacing Y in the axial direction, and is of cylindrical or circularly annular configuration.

3. The slewing ring as claimed in claim 1, wherein the screwing surface has a surface portion which is parallel to the supporting surface, the parallel surface portion running in a rotationally symmetrical manner over the entire inner ring, or wherein a circumferential residual surface surrounds individual screwing surfaces.

4. The slewing ring as claimed in claim 3, wherein the screwing surface is recessed in the inner ring and lies offset in parallel with respect to the remaining residual surface, and wherein an offset of up to four times the rolling body diameter d is formed.

5. The slewing ring as claimed in claim 3, wherein the residual surface is formed in a plane angle W° of from 0° to 75° with respect to the screwing surfaces.

6. The slewing ring as claimed in claim 3, wherein the residual surface is formed in a concavely rounded manner, with a defined radius.

7. The slewing ring as claimed in claim 1, wherein the rolling bodies between the outer ring and the inner ring are of spherical, frustoconical or cylindrical configuration.

8. The slewing ring as claimed in claim 1, wherein the inner ring is connected to a linear actuating drive.

9. The slewing ring as claimed in claim 8, wherein the actuating drive is an actuating drive which is driven by way of a gearwheel.

* * * * *